Aug. 6, 1968  R. NEIDER, DIT CHARTRICE  3,395,964
SPECTACLE MOUNTING WITH BIASED NOSE BRIDGE AND TEMPLE PIECES
Filed April 3, 1964  2 Sheets-Sheet 1

INVENTOR
RENE NIEDER dit CHARTRICE
BY Amster & Rothstein
ATTORNEYS

Aug. 6, 1968   R. NEIDER, DIT CHARTRICE   3,395,964
SPECTACLE MOUNTING WITH BIASED NOSE BRIDGE AND TEMPLE PIECES
Filed April 3, 1964   2 Sheets-Sheet 2

INVENTOR
RENE NIEDER dit CHARTRICE
BY Amster & Rothstein
ATTORNEYS

United States Patent Office 3,395,964
Patented Aug. 6, 1968

3,395,964
SPECTACLE MOUNTING WITH BIASED NOSE BRIDGE AND TEMPLE PIECES
René Niéder dit Chartrice, Le Cannet,
Alpes-Maritimes, France
Filed Apr. 3, 1964, Ser. No. 357,176
2 Claims. (Cl. 351—63)

ABSTRACT OF THE DISCLOSURE

Folding eyeglasses having a force-exerting bridge and also force-exerting hingedly mounted temporal sides which, in the unfolded condition, firmly grip the wearer at the bridge of his nose and at his temples to thereby hold the eyeglasses in place.

---

The present invention relates in general to spectacle mountings and has specific reference to a spectacle mounting characterized on the one hand by the provision of a flexible and elastic bridge member so disposed as to fit on the nose in the fashion of eye-glasses or pince-nez, and on the other hand, by relatively short temporal sides having their ends bent inwards on themselves in order to impart a certain resiliency thereto, said temporal sides being each pivoted on the lenses or their rims by means of a pair of flexible and elastic strips coupled to constitute a hinge-like device, the inner strip being shorter than the outer strip and forming a bight around the inner strip.

According to another feature of this invention, the inturned end portions of the spectacle sides are so arranged that they can fit over the top or bottom edges of the rimmed or rimless lenses without any risk of scoring them, due to the flexibility of the hinge means of said sides; with this arrangement, spectacles having particularly reduced over-all dimensions, especially in their collapsed or folded conditions, can be obtained.

According to a further feature of this invention the strips constituting the hinge means of said spectacle sides are so designed as to constantly urge said sides against the lenses.

According to a complementary feature of this invention, the bridge member of the spectacle mounting is formed initially with a curvature corresponding substantially to the nose curvature, and the ends of said bridge member are provided with integral lips so disposed that when they are secured on the lenses they impart the desired elastic curvature to said bridge member.

The fixation is effected by using conventional members engaging off-set perforations formed in the outer and inner lips or in the eye-glasses so as to produce a pre-stress enabling the bridge member to act with the rims or the nose plates as a pince-nez.

Finally, according to another advantageous feature of this invention, locking means are provided on both temporal sides of the spectacle frame so as to hold them in mutual engagement when the spectacle elements are folded on the bridge member.

The essential advantages deriving from the spectacle mounting of this invention are summarized hereinafter:

(1) The assembling of the spectacle component elements is easy and economical, and applicable to all kinds of rimmed or rimless lenses, and even to sun-glasses.

(2) The over-all dimensions are kept to a minimum due notably to the reduced length of the retractable collapsible or folding sides.

(3) These spectacles are safely maintained on the wear's face due to the pince-nez bridge member and to the inherent resiliency of the temporal sides.

(4) These spectacles can be folded to very reduced over-all dimensions since by construction they tend to fold on themselves and it is even advisable to keep them in this folded condition to accentuate the spring-like action exerted by the junction members during their actual use (notably the bridge member and the side hinges).

In order to afford a clearer understanding of this invention and of the manner in which the same may be carried out in practice, reference will now be made to the accompanying drawings illustrating diagrammatically by way of example a typical form of embodiment of the spectacle mounting constituting the subject-matter of this invention. In the drawings.

Figure 1:
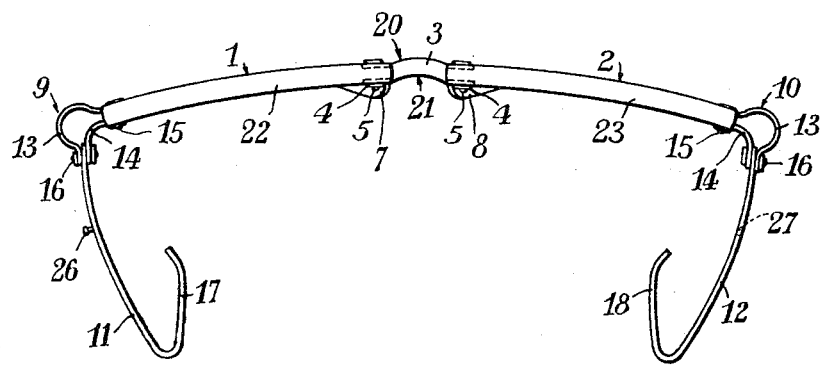
FIGURE 1 is a plan view from above showing the spectacle mounting in the case of rimmed lenses.
Figure 2:
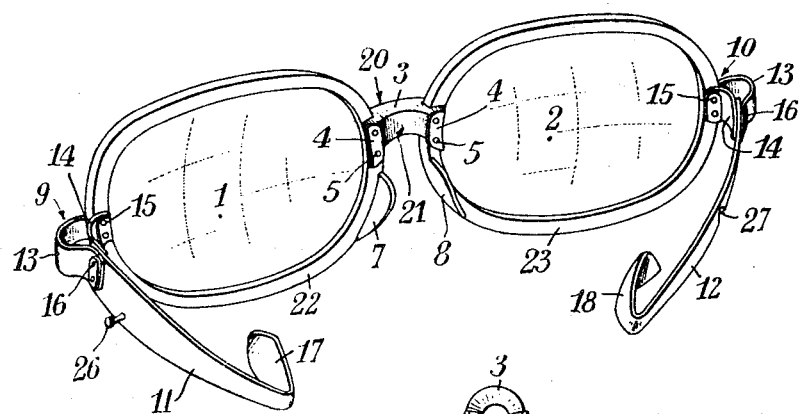
FIGURE 2 is a perspective view from the rear of the same spectacle mounting.

The spectacle mounting for rimmed lenses illustrated in FIGURES 1, 2, 3 and 6, comprises essentially the lenses proper 1, 2, their rims or bezels 22, 23, their short sides 11, 12 and the elements connecting these members.

The rims or bezels 22, 23 are interconnected by a flexible and elastic bridge member 3 set therein at 4 and 5; this bridge member 3 is formed initially, at the workshop, with a curvature corresponding roughly to the nose curvature; moreover, perforations 28 and 29 formed in the lateral lips 30, 31 of this bridge member which fit on the corresponding rim or lens are off-set and differently spaced from the front face to the rear face to impart a pre-stress to said bridge member when fitting the screws or rivets 5 for fastening the bridge member on the ornamental elements and counter-plates 4, these lips 20 and 21 having to this end unequal lengths.

Thus, a pince-nez effect is obtained, notably with the nose plates 7, 8.

The spring-like connecting elements 9, 10 disposed between the rims 22, 23 and the sides 11, 12 consist of a pair of strips 13, 14 of flexible and elastic material fastened at 15 on the rims and at 16 on the sides.

The curvature of, and the spring action exerted by, these strips 13, 14 result from the fact that the inner-element 14 is considerably shorter than the outer element 13, so that on the one hand the folding of sides 11, 12 is permitted, facilitated, imposed, and on the other hand the elastic force is increased as the temporal sides are moved away from each other to put the spectacles on the wearer's face.

The relatively short sides 11, 12 (which may be simple volutes of plastic material, for example) are so shaped as to enable the bent or in-turned portions or spatulate ends 17, 18 to bear conveniently on the temporal flattening of the wearer, so as to safely hold the spectacles on his or her face.

The arrangement of these spatulate end portions or, if desired of the volutes alone provides a certain flexibility producing likewise an elastic action assisting in keeping the spectacles on the wearer's face.

Figure 3:
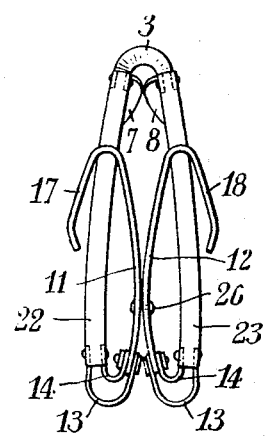
FIGURE 3 is another plan view from above showing the spectacles in their folded condition.

The flexibility of the strips constituting the hinges 9 and 10 permit on the one hand of setting the sides 11, 12 (with or without their spatulate end portions) in the best position on the templates, and on the other hand of folding them so that they are retained by straddling the upper or lower edge of the rimmed or rimless lenses (FIGURE 3).

The temporal sides 11, 12 retained by the lenses by means of their in-turned end portions 17, 18 reduce conveniently the over-all dimensions of the spectacles, whether folded or not, while avoiding any detrimental frictional contact thereof with the lenses.

These spectacles are easily folded since they are constantly urged to this folded condition both by the initial curvature of bridge member 3 and by the hinge means 9, 10 and on the other hand these spectacles are kept in this folded condition when they are not worn.

Means for locking the sides 11, 12 in their folded position when the spectacles are not used may consist for example of a stud or rivet 26 rigid with one of the sides and of a corresponding notch or like recesses 27 formed in the other side.

The form of embodiment just described refers more particularly to spectacles having plastic-rimmed lenses with a bridge member and hinges also made of plastic material such as nylon, and illustrates only the essential features of this invention which, of course, are also applicable to other types of spectacles, as anybody conversant with the art will readily understand.

Figure 4:
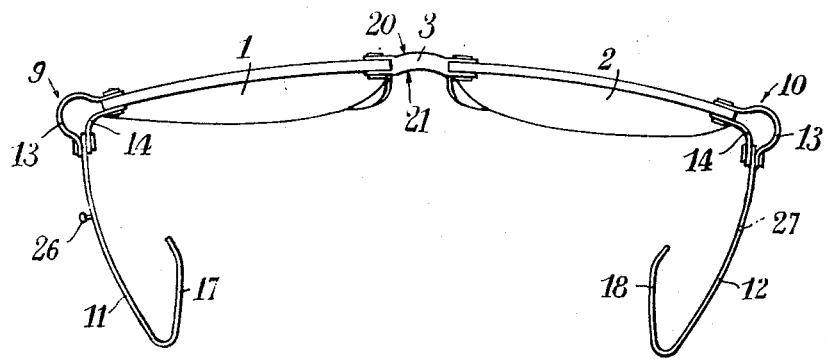
FIGURES 4 and 5 are views similar to FIGURES 1 and 2 but in the case of rimless spectacles.
Figure 5:
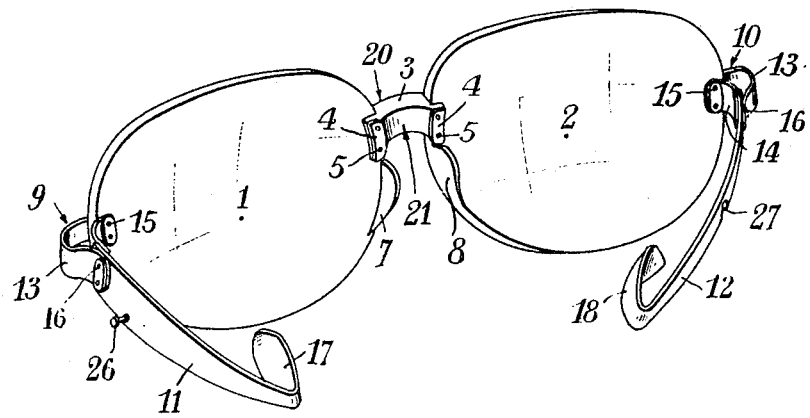
Figure 6:
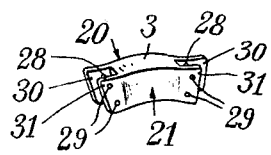
FIGURE 6 is a detail view of the bridge member.

Thus, FIGURES 4 and 5 of the drawings show sunglasses of which the mounting according to this invention comprises two convex lenses 1, 2, the short sides 11, 12 with their elastic folded and spatulate end portions 17, 18, and consists of a bridge member 3 with hinge means 9, 10 having the same disposition as in the preceding example.

Although reference has been made hereinabove to plastic bezels and short sides, it would not constitute a departure from this invention to make these elements from any suitable metal or metal alloy; similarly, the bridge member and hinges may be manufactured from other flexible and elastic materials than plastic fibres and in the form of composite assemblies, or of co-operating separate units.

What I claim is:

1. Spectacle mounting for rimmed or rimless lenses, comprising a bridge member consisting of a piece of flexible and elastic material defined by an inner and an outer pair of curved surfaces having a curvature corresponding substantially to the nose curvature and at either end a pair of parallel lips formed with off-set perforations on the outer lip in relation to the inner lip, means for securing said lips on the inner side edges of the lenses, said means extending through said perforations and being adapted to correspondingly stretch said inner curved surface and compress said outer curved surface to cause said bridge member to be pre-stressed, relatively short temporal sides having their free ends folded inwards in the form of flexible spatulate elements adapted resiliently to bear against the temples and to fit over the upper or lower edges of the lenses in the folded condition of said spectacles, hinge means between said relatively short sides and the outer side edges of the lenses, each hinge means consisting of at least two strips of flexible and elastic material, the inner strip being shorter than the outer strip, said outer strip forming around said inner strip a bight constantly tending to fold said temporal sides against each other, and means for interlocking said temporal sides when and straddles the edges of said lenses in the folded condition of the spectacles.

2. A pair of spectacles or sunglasses having lens members, characterized in that the same comprises a curved bridge piece of flexible and elastic material secured to the lens members, relatively short temporal side arms having free ends bent towards one another to constitute hook-like spring terminal parts, and hinges connecting the said side arms to the lens members, each hinge consisting of at least two overlying strips of flexible and elastic material connected at their ends to the lens member and the side arm so as to form an elastic hinge tending to move the side arms towards one another so as to exert lateral pressure on the wearer's face when in use, one of said overlying strips that is nearer the wearer's face in use being shorter than the other strip so that said other strip is bowed and forms a bight with the first-named strip.

References Cited

UNITED STATES PATENTS

| 1,097,198 | 5/1914 | Troppman | 351—126 X |
| 1,118,631 | 11/1914 | Brennecke | 351—63 |
| 2,280,666 | 4/1942 | Schofield | 351—123 |
| 2,630,569 | 3/1953 | Baratelli | 351—113 X |
| 2,975,426 | 3/1961 | Rabb | 351—63 X |

FOREIGN PATENTS

| 282,225 | 12/1927 | Great Britain. |
| 798,331 | 5/1936 | France. |
| 928,486 | 11/1947 | France. |
| 162,284 | 2/1949 | Austria. |

DAVID H. RUBIN, *Primary Examiner.*

W. L. BROWN, *Assistant Examiner.*